Jan. 21, 1958   H. J. DUDENHAUSEN   2,820,303
INTEGRATING TURN INDICATOR
Filed Feb. 4, 1954
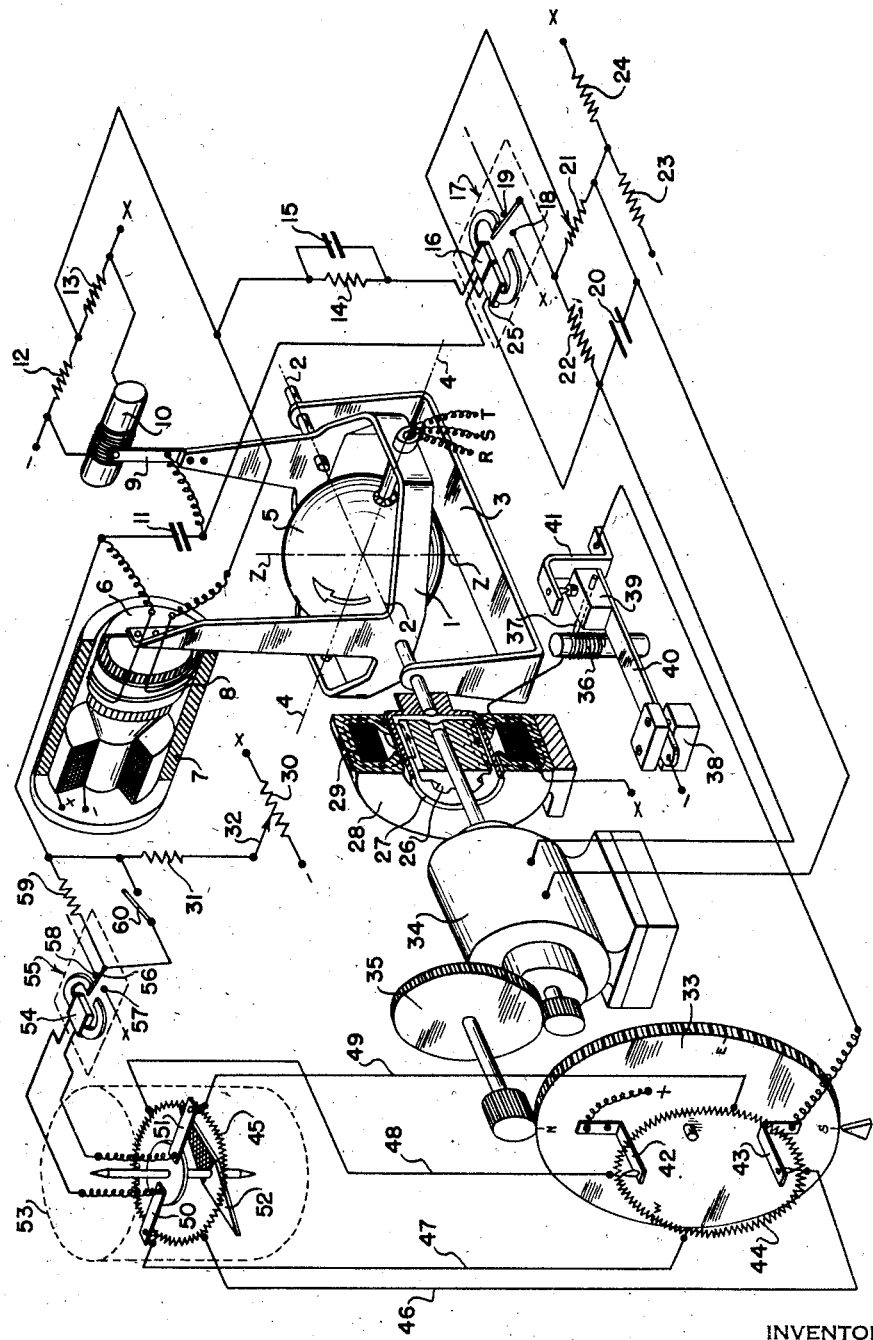
INVENTOR
Hans Jurgen Dudenhausen
BY
Pennie Edmonds Morton Barrows + Taylor
ATTORNEYS United States Patent Office 2,820,303
Patented Jan. 21, 1958

2,820,303

INTEGRATING TURN INDICATOR

Hans Jurgen Dudenhausen, Stuttgart, Germany, assignor to Intavex, Inc., New York, N. Y., a corporation of New York Application February 4, 1954, Serial No. 408,133

9 Claims. (Cl. 33—222)

My invention relates to an integrated rate gyro with an unlimited range of measurement. Gyroscopic devices suspended on gimbals are generally used on vehicles for the measurement of the horizon or the heading, inasmuch as pendulums are not suitable for measuring the position of the horizon due to the accelerations which take place in travel, and since devices which use the magnetic field of the earth to determine the heading, generally give false indications when accelerations and changes in transverse and longitudinal positions occur. Gyroscopic devices suspended on gimbals are also sensitive to acceleration and give errors of indication which depend on the heading, due to the kinematics of the gimbal suspension, when they are used for instance to indicate the heading. The provision in the vehicle of a platform, which is stabilized by a gyro, on which platform an induction compass system can be arranged has been attempted. However, since, due to the pendulum control of this stabilizing device, errors in inclination of the stabilized platform occur, especially in case of the long-lasting accelerations of modern high-speed airplanes, these heading-indicating systems also give erroneous and inconsistent heading indications. Furthermore, this system is expensive and is excessive in volume. Numerous attempts have been made to integrate the measured values of precession gyros, so-called rate gyros, in order in this way to measure exactly, and without limitation to small angles, the angles of inclination and heading in airplanes. These have however been unsuccessful up to the present time, due to the excessively large threshhold of excitation of the integration devices (for instance electric counting motors, mechanical integrating devices, etc.) and due to the fact that the rate gyro measures the angular velocity $\omega$ around a stationary axis of the vehicle, for instance the yaw axis $z$, which, however, is variably inclined when the airplane turns with respect to the true vertical around which it is desired to make the measurements.

The object of the present invention is an integrating rate gyro which makes it possible to indicate in vehicles, regardless of the accelerations occurring in operation, the true heading around the vertical axis.

The invention proceeds from the known fact that by inserting a condenser in the restraint excitation circuit of a rate gyro which is electromagnetically restrained as a function of its precession motion, the rate gyro is made into a goniometer. That is, the angular displacement of the gimbal frame of such a modified rate gyro is proportional to the amount of turn around its axis of measurement. The voltage input to the electromagnetic restraining device, in this system, is proportional to the angular path traversed around the axis of measurement. Due to the limited range of deflection of the electromagnetic restraining device, an integration range of only a few angular degrees around the axis of measurement can be obtained with this device.

In accordance with the present invention, the integration range of this known integration device is increased to any desired extent by energizing a reversible electric motor of very short starting time from the circuit which energize the electromagnetic restraining device, via a pulse amplifier. The motor applies its torque via an electromagnetic eddy current coupling to the sensitivity axis (precession axis) of the rate gyro in such a manner that the voltage applied to the motor is reduced. The number of revolutions of the motor is then proportional to the angular path around the axis of measurement of the rate gyro. In order to obtain an unlimited range of integration of this novel integrating rate gyro around the true vertical, even in airplanes during curvilinear flight, the exciting current of the electromagnetic eddy current coupling is controlled, in accordance with the present invention, by an accelerometer which measures the acceleration (including that of gravity) in the direction of the axis of measurement of the rate gyro which, in this case, is parallel to the yaw axis of the airplane, this control being effected in such a manner that with an increase in acceleration in the direction of the yaw axis of the airplane the excitation current of the electromagnetic eddy current coupling decreases proportionally. Under the assumption, which is practically always true, that in curvilinear flight the direction of apparent gravity is parallel to the plane of symmetry of the airplane and that only small path inclinations occur, there is obtained for up to 80 degrees of bank of the airplane in curvilinear flight an exact indication of the heading with this novel integrating rate gyro. Furthermore, the invention affords the possibility of correcting the integration result of this device with an absolute reference device. The invention will now be further described in detail by reference to the accompanying drawings in which the single figure of drawings is a diagrammatic perspective representation, partly in section, of one embodiment of the invention, providing a heading indication which is checked by a simple magnetic compass.

In the drawings, the frame 1 of the rate gyro is supported for rotation around the axis 2—2 in the housing 3. The axis 4—4 which is stationary with respect to the frame 1 is at right angles to the axis 2—2. Around this axis 4—4 there turns the rotor of a gyroscope 5, driven for instance with three-phase current (R, S, T). By means of a light arm affixed to the frame 1, a support 6 carries a coil or winding 8 in the annular field of a continuously excited electromagnet 7. The support 6, winding 8 and magnet 7 form a structure similar in principle to that of a dynamic loud-speaker except that as will hereinafter be explained, it may be advantageous to form the support 7 as a cup of conducting material. When a current flows in winding 8, a torque is produced which tends to rotate the frame 1 about its axis 2—2, the direction of rotation depending on the direction of the current in the winding. The wiper 9 which slides on the potentiometer 10, the housing of which is stationary, is also rigidly connected with the frame 1. If the frame 1 turns about its axis 2—2, the wiper, depending on the direction of rotation, moves to turns of higher or lower electric potential of the potentiometer 10. The electric potential of the wiper 9 therefore depends on the position of the frame 1 with respect to the housing 3 of the rate gyro.

The wiper 9 is connected via the capacitor 11 with one end of the winding 8. The other end of the winding 8 is connected to a fixed electric center point, formed by the two resistances 12, 13.

The axis of measurement $z$—$z$ of the rate gyro is perpendicular to the axes 2—2 and 4—4. If the housing 3 of the gyro is rotated about the measurement axis $z$—$z$ with the angular velocity $\omega_z$, the frame will be in equilibrium when a counter-torque equal in magnitude to $-\delta_k \cdot \omega_z$ acts about the axis 2—2, $\delta_k$ being the moment of inertia of the gyro 5. This counter-torque is produced when a current of given direction and intensity flows through the winding 8. The frame 1 therefore, first of all rotated with the housing 3 about its axis z—z at angular velocity $\omega_z$, precesses around its axis 2—2, and thus moves the slider 9 on the potentiometer 10 so that a charging current flows via the capacitor 11 through the winding 8. The frame 1 assumes such a final angular velocity around its axis 2—2 that the charging current of the capacitor which flows through the immersion-coil winding 8 produces the torque $-\delta_k \cdot \omega_z$. Inasmuch, however, as the maximum angular motion about the axis of rotation 2—2 is limited by the permissible travel of the winding 8 and by the length of the potentiometer 10, the integration range of this device is also limited. With the apparatus heretofore available there has been obtained at a reasonable expense and with the required precision of measurement an integration range of $\int \omega_z dt = 2$ to 6 angular degrees.

If the slider 9 is at the center of the potentiometer 10, the potential on the slider 9 is zero. If the housing 3 is turned about the axis z—z, the slider moves outward, in accordance with what has been stated above, in a corresponding direction and an increasing potential occurs between the slider 9 and the electric center point 12—13, due to which, in accordance with the present invention, a current also flows via a differentiating device consisting of the resistance 14 with its condenser 15 connected in parallel and via the coil 16 of the polarized relay 17. This current, considered statically, is proportional to the deflection of the slider 9 on the potentiometer 10, or proportional to the angular deflection of the housing 3 around the measuring axis z—z of the integrating rate gyro. Let us assume that the capacitance of the capacitor 11 is so dimensioned that, for example, with an angle of rotation around the axis of measurement z—z of $\int \omega_z dt = 1$ angular degree, the slider 9 has reached the end of the slide path of the potentiometer 10. If a D. C. voltage of 24 volts, having the polarity shown in the drawing, is applied across the equal resistances 12, 13, the voltage between the slider 9 and the junction thereof will be $E = 12$ volts. A fraction of this voltage, for instance $\pm 0.2$ volt, is however sufficient to shift the armature of the polarized relay 17 to the corresponding contact 18 or 19. In this way, the armature of the motor 34 is placed under voltage via the electric centerpoint between resistances 23, 24 and starts corresponding in clockwise or counter-clockwise direction. On closing of the armature of relay 17 to one of the contacts 18 and 19 (according to the direction of shift of the slider 9 from the mid-point of potentiometer 10), a voltage is developed across the coil 25, depending in sign and amount on the setting of the tap on potentiometer 21. By selection of the polarity of the voltage across coil 25, the resulting current therethrough can be made to develop a flux either aiding or opposing, in its effect on the armature of the relay, the flux of the coil 16. In this way there are fed to the motor current pulses of such a nature that the speed of rotation of the motor 34 is, to a far-reaching extent, proportional to the voltage at the coil 16. The motor 34, therefore, in cooperation with the pulse control circuit of relay 17 has an adjustable speed range which may for example have minimum and maximum values related as $$n_{min}/n_{max} = 1:60$$

With these relative values of minimum and maximum motor speed, we may for the sake of concreteness further assume that with an angle of rotation of 1/60 degree around the measuring axis z—z of the integrating rate gyro, the speed of rotation of the motor 34 will correspondingly be $n_{min} = 100$ R. P. M., while the motor speed will be $n_{max} = 6000$ R. P. M. when the corresponding angle of rotation has reached $= 1°$.

Firmly attached to the shaft of the motor 34 there is a toothed wheel 26 of ferromagnetic material which is loosely surrounded by a cup 27 of material of good electric conductivity (copper or aluminum). The cup 27 is rigidly connected with the frame 1 coaxially of the axis 2—2 of the gyro and is, in turn, loosely surrounded by an electromagnet 28. If the winding 29 of the electromagnet 28 is connected via the movable contact 37 on resistance 36, magnetic lines of force will pass through the cup 27 as shown in dashed lines in the drawing. If, now, the armature of motor 34 is subjected to voltage via the pulse relay circuit of relay 17, the toothed wheel 26 which rotates with the motor will produce eddy currents in the cup 27. In this way a torque is exerted on the cup 27 and on the frame 1 tending to rotate it about the axis 2—2. This torque is proportional to the speed of rotation of the toothed wheel 26 and the number of excitation ampere-turns of coil 29 of the electromagnet 28.

The excitation ampere-turns of the electromagnet 28 are so dimensioned by selecting the voltage on the coil 29 that, for example, with a speed of rotation of the motor 34 and hence of the toothed wheel 26 of $$n_{max} = 6000 \text{ R. P. M.}$$

there is exerted on cup 27 and frame 1 about axis 2—2 a torque equal to that which appears in opposing sense as the precession moment $\delta_k \cdot \omega_z$ around the axis 2—2 for a given speed of rotation around the measuring axis z—z of $\omega_z = 30$ angular degrees/second.

The number of revolutions per minute and the direction of rotation of the motor 34 are, as indicated above, determined by the position of the slider 9 on the potentiometer 10, via the pulse control circuit of the relay 17.

Next, let use assume that the housing 3 of the gyro is rotated with another given speed of rotation $\omega_{z2}$ around the measuring axis z—z somewhat smaller than 30 degrees/second. In such case, the corresponding precession moment $\delta_k \cdot \omega_{z2}$ will be in equilibrium with the countertorque supplied by the eddy-flow coupling 26—29 when the motor 34 operates at a somewhat lesser speed of rotation than $n_{max} = 6000$ R. P. M. This motor speed will be reached before the slider 9 quite reaches the corresponding end of the potentiometer 10. Therefore, the angle given by the time integral of the speed of rotation $\omega_{z2}$ around the measuring axis z—z is equal to the angle given by the time integral of the speed of rotation $n$ of the motor 34, reduced by the integration angle which is required in order to permit the slider 9 to move to the corresponding place of the potentiometer 10.

The motor 34 drives a compass rose disk 33 via a gearing 35. The gearing 35 is so designed that a given angle of rotation of the compass rose disk 33 corresponds to the same angle of rotation of the housing 3 around the measuring axis z—z. For the above example, the angular indication of the compass rose disk 33 trails by not quite 1 angular degree behind the angle of rotation traversed by the housing 3 around the measuring axis z—z, inasmuch as, in order for the motor to reach the required speed of rotation $n$ of approximately 6000 R. P. M., the slider 9 must be at the corresponding end of the potentiometer path, which corresponds, in accordance with what has been stated above, to an integration angular path of approximately 1 angular degree around the measuring axis z—z. The angle of lag becomes smaller proportionally to the angular velocity $\omega_z$ around the measuring axis z—z. If, for instance, the angular velocity $\omega_z$ is only 0.1 angular degree per second, the slider 9 moves from its central position in the corresponding direction until, due to the exact integration by the capacitor 11, the minimum voltage of the capacitor 11 or of the coil 16 has reached the minimum voltage necessary to excite the relay, namely $E_{min} = 0.2$ volt. The motor 34 then starts and moves the slider 9 back into the central position via the eddy current coupling, due to which the motor 34 again stops. In our example, one step of the motor 34 always takes place when an angle of rotation around the measuring axis z—z of 1/60 degree is reached and therefore, in the present case, every 0.17 second. The combination of integrating rate gyro, pulse controller 17, motor 34 and eddy current coupling 26—29 represents a closed control circuit in accordance with the speed-of-operation method. The required damping in this control circuit is obtained by an eddy current damping action provided by the support 6 for winding 8, the support being made of aluminum, which moves in the magnetic field of the strong electromagnet 7. Magnet 7 can be alternatively a permanent magnet. A further damping influence is supplied by the differentiating device which consists of the resistance 14 with its capacitor 15 connected in parallel with it. The RC combination 14, 15 passes without substantial attenuation the steep fronts of voltage waves occurring upon sudden displacement of the contact 9 but attenuates the remainder of such voltage waves. Undesirable effects due to the inductance of the armature of the motor 34 are eliminated by the capacitor 20. The precision of measurement of this novel integrating device is limited only by friction in the bearings of frame 1 which permit it to rotate about axis 2—2 in housing 3 and by friction of the slider 9 on the potentiometer 10. The voltage source 9, 10 may advantageously take the form of one of the known frictionless and regeneration-free voltage pick-off systems, capacitive or photoelectric, it being not necessary that such pick-off system have absolutely linear characteristics. Unbalances of the gimbal frame 1 which would simulate a precession torque around the axis 2—2 and thus a fictitious angular velocity $\omega_z$ around the axis z—z can be compensated by displacing the slider 32 on the potentiometer resistance 30. The position of the slider 32 on the potentiometer 30 can be so adjusted that there flows via resistance 31 in series with the winding 8 such a current that the torque produced thereby on the gimbal frame 1 is in equilibrium with the torque produced by the imbalance of the gimbal frame.

If the above-described apparatus is to be used to indicate the true heading of an airplane, the apparatus, for the reasons set forth below, must also be provided with an accelerometer the parts of which are shown at reference characters 36 to 41.

It is assumed that during curvilinear flight, the angle of bank is so controlled that the direction of apparent gravity is parallel to the plane of symmetry of the airplane. This plane is determined by the longitudinal axis and the yaw axis of the airplane. Furthermore, let it be assumed that the curvilinear flight is carried out in a horizontal plane. For small path inclinations, the following relationships are approximately valid. If the derivative of the heading with respect to time $$\frac{d\psi}{dt}$$

is designated $\Omega$, the true air speed is designated V, and the angle of bank is designated $\varphi$ and gravitational acceleration g, we have the following relationship:

$$\tan \varphi = \frac{V \cdot \Omega}{g}$$

If the airplane is controlled in accordance with the above assumptions (horizontal flight at equilibrium), the airplane, assuming a constant air speed, will turn around a vertical axis with the angular velocity $\Omega$. Its angular velocity around the yaw axis $\omega_z$ is equal to the component of $\Omega$ in the direction of this axis, namely: $\omega_z = \Omega \cdot \cos \varphi$. If the resultant acceleration is designated P, we have:

$$\omega_z = \Omega \cdot \frac{g}{P}$$

The sensitive axis z—z of the integrating rate gyro used is parallel to the yaw axis of the airplane. Accordingly, $\omega_z$ is measured and not $\Omega$. However, $\omega_z$ and $\Omega$ are related to each other in a simple manner by the acceleration P in the direction of the yaw axis. The accelerometer makes it possible to correct the measured result indicated by the compass card plate, namely in the present case, the integral of the angular velocity $\int \omega_z dt$ in such a manner that for all air speeds which give angles of bank $\varphi < 80°$, the indication of the compass rose disk 33 corresponds to the true heading angle (in the horizontal plane). It was necessary to provide a given number of excitation ampere-turns in coil 29 in order that the angular velocity $\omega_z$ around the axis z—z, i. e. around the yaw axis of the airplane, might be the same as that of the compass rose disk 33. Inasmuch, however, as now the angular velocity of the compass disk is to correspond to the derivative of the heading angle with respect to time, $$\frac{\delta \psi}{dt} = \Omega$$

the excitation current of the coil 29 must be changed to be inversely proportional to the acceleration P, in which case we have $$\frac{\omega_z}{\Omega} = g \cdot \frac{1}{P}$$

as derived above.

The excitation current for the winding 29 flows through a resistance 36 with its slider 37. The slider 37 is affixed to the weight 39. The weight 39 is arranged on a leaf-spring 40 which is clamped in a frame 38 stationary with respect to the airplane. Under the accelerating force P, the spring is bent in such a manner that its deflection is proportional to the value of the force P. As a result of this bending the slider 37 slides over the resistance 36. The increase in resistance of the circuit formed by the coil 29 and the resistance 36 with motion of the slider 37 is so adjusted by a proper design of the resistance 36 that the excitation current in the coil 29 varies in inverse proportion to the acceleration P and the deflection of the spring 40. The weight 39, which in this case advantageously consists of copper, moves between the poles of a magnet (not shown in the drawing), due to which the natural oscillations of the system consisting of the spring 40 and the weight 39 are damped.

As is well known, in the operation of gyro devices, there occur small unbalances on the gimbal frame 1, for instance by weight displacements, caused by heat or vibration, which unbalances cause an undesired precession of the frame 1. Depending on the amount and position of these unbalances, a change in the heading will then be indicated on the compass rose disk 33, which change does not agree with the true change of the heading. Inasmuch as it has not been possible up to the present time to construct gyro devices in connection with which this undesired effect does not appear, it is always necessary continuously to check the measured results of gyro compasses against an absolute direction indicator. This is possible in an extremely simple manner in connection with the installation described here. Furthermore, the compass rose disk of gyrocompasses must be set when placed in operation by means of an absolute direction indicator. This process is also carried out automatically in a very simple manner in connection with the compass installation described herein.

On the compass rose disk 33, there are fastened two sliders 42 and 43, to which there is applied a D. C. voltage of the polarity shown in the drawing. The negative terminal of the D. C. source is connected to slider 43 via contacts which are fastened to the weight 39 and the contact holder 41. These contacts are normally closed and only open under the influence of the acceleration force P.

The sliders 42 and 43 move together, displaced 180° apart, over a closed wire potentiometer winding 44. A similar potentiometer winding 45 is located in a magnetic compass whose housing 53 is suspended on gimbals in the plane. The two potentiometer windings 44 and 45 are tapped at points successively 90° apart and the taps are conductively connected with each other in the manner shown in the drawing by wires 46 to 49. On the potentiometer winding 45 there move, furthermore, sliders 50 and 51 spaced 180° apart. These sliders are moved by the compass needle 52 when the gimbal-suspended compass housing 53 with which the potentiometer winding 45 is rigidly connected is turned. In the position shown in the drawing, the potential between the two sliders 50 and 51 is zero. If, however, the compass housing 53 is turned, the sliders 50 and 51 move through equal angles on the winding of the potentiometer winding 45. Consequently, a current, the direction of which depends on the direction of deflection of the compass housing 53, flows through the coil 54 of a polarized relay 55. The armature 56 of the polarized relay 55 is in this way moved to the one of its contacts, for example contact 57. Therefore, a current flows through the resistance 59, through the coil 8 and to the electric centerpoint 12, 13; in this way, the slider 9 is deflected and the motor 34 starts in the manner already described and in a direction of rotation such that due to the rotation of the sliders 42 and 43 which is thereby produced, the potential between the sliders 50 and 51 becomes smaller until the motor 34 stops. In this manner it results therefore that the compass rose disk 33 always sets itself in the direction of the compass needle 52. In practice, the speed of operation with which the compass rose disk 33 follows the compass needle 52 is kept very small by means of the series resistance 59, for example to values of from 2 to 4 angular degrees/minute, inasmuch as only the measurement result of the integrating rate gyro compass installation is to be checked by the magnetic compass. If, however, upon setting the entire installation into operation, the compass rose disk 33 is not on the true magnetic course, this low speed can be increased by short-circuiting the resistance 59 by means of the push-button contact 60, and the indications of the compass rose disk 33 can be brought into rapid agreement with the true compass course.

As is well known, the indications of unlevelled magnetic compasses under the influence of accelerations such as occur in curvilinear flight and also in accelerated linear flight are not correct. A magnetic compass control of the integrating rate gyro compass described herein under conditions of acceleration would therefore not improve the integrated result of that integrating rate gyro compass but would even falsify it. Therefore, the feeding of current to the slider 43 is interrupted when the accelerometer responds under the accelerative force P, inasmuch as the pair of contacts arranged on the weight 39 and the bracket 41 which is fastened to the airplane is opened. In series with the contacts on this accelerometer which acts in the direction of the yaw axis of the airplane, there may also be connected a pair of contacts on an accelerometer (not shown) which acts in the direction of the longitudinal axis, so that the monitoring of the compass will also be shut off as long as the compass is under the influence of the longitudinal accelerations.

Inasmuch as the so-called magnetic master compass 53 must always be installed at a magnetically undisturbed place of the airplane, its indication is not directly visible to the pilot. It is, however, frequently desirable to have a direct indication of the master compass also in the visible vicinity of the pilot, especially when the indication of the integrated rate gyro compass is not obtained, for instance due to failure of the current feed RST to the gyro 5. This requirement can be complied with in a very simple manner with the compass system described herein. By means of a switch (not shown in the drawing) the two leads to the coil 54 of the relay 55 are switched to the coil 16 of the relay 17, in which connection, of course, the connection of the coil 16 to the slider 9 and the electric centerpoint 12, 13 must, at the same time, be broken.

From the above description, it can be seen that the compass rose disk 33 now directly follows behind the compass needle and thus the course of the master compass is directly indicated.

I claim:

1. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, and means to drive said motor at a speed substantially proportional to departures of said frame from said zero position.

2. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, and means to drive said motor at a speed substantially proportional to said voltage.

3. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, and means including an amplifier for applying said voltage to said motor.

4. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, a polarized relay controlling the application of voltage in opposite polarities to the energizing circuit of said motor, said relay including a feedback coil traversed by part of the armature current of said motor, and means to energize the actuating coil of said relay from said voltage.

5. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, a polarized relay controlling the application of voltage in opposite polarities to the energizing circuit of said motor, said relay including a feedback coil traversed by part of the armature current of said motor, and means to energize the actuating coil of said relay from said voltage, said last-named means including a differentiating circuit connected in series with said actuating coil.

6. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, a polarized relay controlling the application of voltage in opposite polarities to the energizing circuit of said motor, said relay including a feedback coil traversed by part of the armature current of said motor, and means to energize the actuating coil of said relay from said voltage, said last-named means including a parallel combination of resistance and capacity in series with said actuating coil.

7. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means to drive said motor at a speed proportional to departures of said frame from said zero position, means coupling said motor to said frame for rotation of the latter about said first axis, said coupling means transmitting a torque proportional to motor speed, and means to vary the torque transmitted by said coupling means with accelerations suffered by said indicator parallel to an axis of turn measurement perpendicular to said first axis.

8. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means to drive said motor at a speed proportional to departures of said frame from said zero position, an electromagnetically energized eddy current coupling arranged to couple said motor to said frame for rotation of said frame about said axis, the energizing circuit for said coupling including a variable resistance, and means responsive to accelerations of said indicator parallel to an axis of turn measurement perpendicular to said first axis, said acceleration-responsive means being coupled to said resistance to vary the value thereof directly with the component of accelerations suffered by said indicator parallel to said measurement axis.

9. An integrating turn indicator for a vehicle comprising a support, a frame mounted on said support for rotation with respect thereto about a first axis, a rotor mounted on said frame for rotation with respect thereto about a second axis perpendicular to said first axis, a winding fixed with respect to said frame for motion with said frame in a magnetic field, means coupled to said frame for deriving from a direct current potential difference a voltage varying in sign and magnitude with departures of said frame from a zero position about said first axis, a condenser, means to apply said voltage to a series circuit including said winding and condenser, a reversible motor, means coupling said motor to said frame for rotation of the latter about said first axis, said coupling means transmitting a torque proportional to motor speed, means to drive said motor at a speed substantially proportional to departures of said frame from said zero position, a first closed circular potentiometer, a pair of first brushes engaging said first potentiometer at points 180° apart thereon, means driven by said motor effecting rotation of said first brushes on said first potentiometer at a rate related to the speed of said motor by the same factor as that relating rotation of said support about a turn axis of said vehicle perpendicular to said first axis to the speed of said motor, a compass, a second closed circular potentiometer, a pair of second brushes engaging said second potentiometer at points 180° apart thereon, means to move said second brushes over said second potentiometer at the same rate as the rate of change of bearing of said compass with respect to vehicle heading upon change of vehicle heading about said turn axis, connections between said first and second potentiometers at points thereof 90° apart, means to apply a potential difference between said first brushes, and means energized by voltage appearing between said second brushes to energize said winding with a voltage of polarity dependent on the polarity of the voltage between said second brushes.

References Cited in the file of this patent

UNITED STATES PATENTS

| | | |
|---|---|---|
| 2,053,183 | Crane et al. | Sept. 1, 1936 |
| 2,274,443 | Fischer | Feb. 24, 1942 |
| 2,361,790 | Noxon | Oct. 31, 1944 |
| 2,451,710 | Bechberger | Oct. 19, 1948 |
| 2,590,428 | Noxon | Mar. 25, 1952 |
| 2,602,239 | Wrigley | July 8, 1952 |

UNITED STATES PATENT OFFICE
Certificate of Correction

Patent No. 2,820,303

January 21, 1958

Hans Jurgen Dudenhausen

It is hereby certified that error appears in the printed specification of the above numbered patent requiring correction and that the said Letters Patent should read as corrected below.

Column 4, line 28, for "$\omega_z = 30$" read —$\omega_{z1}=30$—; line 32, for "use" read —us—; line 69, for "the minimum voltage" read —the voltage—; column 10, line 16, after "said", third occurrence, insert —first—.

Signed and sealed this 25th day of March 1958.

[SEAL]

Attest:
KARL H. AXLINE,
*Attesting Officer.*

ROBERT C. WATSON,
*Commissioner of Patents.*